United States Patent
Arimoto et al.

(10) Patent No.: US 10,507,550 B2
(45) Date of Patent: Dec. 17, 2019

(54) EVALUATION SYSTEM FOR WORK REGION OF VEHICLE BODY COMPONENT AND EVALUATION METHOD FOR THE WORK REGION

(71) Applicant: TOYOTA SHATAI KABUSHIKI KAISHA, Kariya-shi (JP)

(72) Inventors: Katsuhide Arimoto, Aichi (JP); Takao Mizuno, Aichi (JP); Yuta Yokomichi, Aichi (JP)

(73) Assignee: TOYOTA SHATAI KABUSHIKI KAISHA, Kariya-shi (JP)

( * ) Notice: Subject to any disclaimer, the term of this patent is extended or adjusted under 35 U.S.C. 154(b) by 56 days.

(21) Appl. No.: 15/807,764

(22) Filed: Nov. 9, 2017

(65) Prior Publication Data
US 2018/0065211 A1    Mar. 8, 2018

Related U.S. Application Data (63) Continuation of application No. PCT/JP2016/077317, filed on Sep. 15, 2016.

(30) Foreign Application Priority Data

Feb. 16, 2016    (JP) .................................. 2016-027110

(51) Int. Cl.
*B23K 31/12* (2006.01)
*G01B 11/00* (2006.01)
(Continued)

(52) U.S. Cl.
CPC ............ *B23K 31/125* (2013.01); *B23K 11/11* (2013.01); *G01B 11/00* (2013.01);
(Continued)

(58) Field of Classification Search
CPC .. G01B 2210/30; G01B 11/002; G01B 11/00; A61B 5/18; B60R 2021/346;
(Continued)

(56) References Cited

U.S. PATENT DOCUMENTS 5,809,161 A * 9/1998 Auty .......................... G01P 3/38
                                                    340/937
5,809,658 A * 9/1998 Jackson ............. G01B 11/2755
                                                    33/203.18
(Continued)

FOREIGN PATENT DOCUMENTS

JP    2004-78987 A    3/2004
JP    2006-088160     4/2006
(Continued)

OTHER PUBLICATIONS

International Search Report dated Nov. 15, 2016 in PCT/JP2016/077317 filed Sep. 15, 2016 (with English Translation).
(Continued)

*Primary Examiner* — Aklilu K Woldemariam
(74) *Attorney, Agent, or Firm* — Oblon, McClelland, Maier & Neustadt, L.L.P.

(57) ABSTRACT

A work region evaluating system includes an imaging unit and a processing unit. The processing unit includes an image processing section that converts a three-dimensional image of a vehicle body component recorded by the imaging unit to three-dimensional image data, an extraction section that extracts work regions and reference regions respectively from both the three-dimensional image data and three-dimensional design data, an alignment section that aligns the three-dimensional image data with the three-dimensional design data with reference to the reference regions, and an evaluation section that evaluates a relation between the work region extracted from the three-dimensional image data and the work region extracted from the three-dimensional design
(Continued)

data, based on the three-dimensional image data and the three-dimensional design data which are aligned with each other by the alignment section.

18 Claims, 11 Drawing Sheets

(51) Int. Cl.
| | | |
|---|---|---|
| G06T 7/30 | (2017.01) | |
| H04N 13/204 | (2018.01) | |
| G06K 9/46 | (2006.01) | |
| G06T 7/00 | (2017.01) | |
| B23K 11/11 | (2006.01) | |
| G06K 9/62 | (2006.01) | |
| G06K 9/00 | (2006.01) | |
| G06K 9/32 | (2006.01) | |

(52) U.S. Cl.
CPC ....... *G06K 9/00214* (2013.01); *G06K 9/3233* (2013.01); *G06K 9/4604* (2013.01); *G06K 9/6204* (2013.01); *G06K 9/6267* (2013.01); *G06T 7/001* (2013.01); *G06T 7/30* (2017.01); *H04N 13/204* (2018.05); *G06K 2209/19* (2013.01); *G06T 2207/10028* (2013.01); *G06T 2207/30164* (2013.01); *G06T 2207/30248* (2013.01)

(58) Field of Classification Search
CPC ...... B60R 2300/802; B60R 2011/0003; G06K 9/00825; G06K 2209/23; G06K 9/00201; G06K 9/00664; G06K 9/3275; G06K 2209/19; G06K 9/00805; G06K 9/209; G06K 9/4604; G06K 9/6204; G06K 9/00798; G06K 2209/15; G06K 9/00785; G06K 9/3241; G06K 9/00791; G06T 2207/30248; G06T 7/001; G06T 7/75; G06T 2207/30252; G06T 2207/30261; G06T 2207/30236; G06T 2207/30256; G08G 1/0175; G08G 1/017; G08G 1/165; G08G 1/166; G08G 1/168; G08G 1/167; G01C 11/06; H04N 7/181; B62D 15/0275; B62D 15/0295; G01S 13/931
USPC .......... 382/103, 104, 106; 348/46, 143, 148, 348/149; 356/155
See application file for complete search history.

(56) References Cited

U.S. PATENT DOCUMENTS

| | | | | |
|---|---|---|---|---|
| 8,134,608 | B2* | 3/2012 | Yamashita | B60R 1/00 348/148 |
| 8,275,193 | B2* | 9/2012 | Lin | G06K 9/3216 382/103 |
| 2003/0099400 | A1* | 5/2003 | Ishikawa | G06K 9/3241 382/190 |
| 2005/0196034 | A1* | 9/2005 | Hattori | B60R 1/00 382/154 |
| 2005/0264472 | A1* | 12/2005 | Rast | G09G 3/14 345/30 |
| 2006/0115122 | A1* | 6/2006 | Nagaoka | G06K 9/3241 382/104 |
| 2008/0089557 | A1* | 4/2008 | Iwaki | G01C 3/06 382/106 |
| 2008/0097699 | A1* | 4/2008 | Ono | B60R 21/0134 701/300 |
| 2008/0255731 | A1* | 10/2008 | Mita | B60R 21/01538 701/45 |
| 2010/0066833 | A1* | 3/2010 | Ohshima | B60R 1/00 348/148 |
| 2010/0211267 | A1* | 8/2010 | Shimazaki | B60R 1/00 701/42 |
| 2010/0222925 | A1* | 9/2010 | Anezaki | G05D 1/0221 700/253 |
| 2010/0245578 | A1* | 9/2010 | Kakinami | B60R 1/00 348/148 |
| 2012/0013713 | A1* | 1/2012 | Sumitomo | B60R 1/00 348/46 |
| 2014/0147008 | A1* | 5/2014 | Aoki | G08G 1/0175 382/104 |
| 2014/0333729 | A1* | 11/2014 | Pflug | G06T 15/20 348/47 |
| 2015/0195496 | A1* | 7/2015 | Hayakawa | B60R 1/00 348/118 |
| 2015/0220793 | A1* | 8/2015 | Kiyohara | G06K 9/00805 382/103 |
| 2017/0282813 | A1* | 10/2017 | Hashimoto | B60R 1/00 |

FOREIGN PATENT DOCUMENTS

| | | |
|---|---|---|
| JP | 2007-152371 | 6/2007 |
| JP | 2009-172608 | 8/2009 |
| JP | 2010-025615 | 2/2010 |
| JP | 2010-271943 | 12/2010 |
| JP | 2013-088169 | 5/2013 |

OTHER PUBLICATIONS

Written Opinion dated Nov. 15, 2016 in PCT/JP2016/077317 filed Sep. 15, 2016.
Notice of Reasons for Refusal dated Jun. 11, 2019 in Japanese Patent Application No. 2016-027110 (with unedited computer generated English translation) citing document AO therein, 6 pages.

* cited by examiner

DIFFERENCE BETWEEN TWO COORDINATE SYSTEMS

EVALUATION SYSTEM FOR WORK REGION OF VEHICLE BODY COMPONENT AND EVALUATION METHOD FOR THE WORK REGION

CROSS-REFERENCE TO RELATED APPLICATIONS

This application is the U.S. national stage of International Patent Application No. PCT/JP2016/077317, filed on Sep. 15, 2016, which claims priority to Japanese Patent Application No. 2016-027110, filed on Feb. 16, 2016. The entire contents of each of the above applications are hereby incorporated by reference herein in entirety.

TECHNICAL FIELD

The present invention relates to a technique to evaluate a work region of a vehicle body component.

BACKGROUND ART

In a manufacturing process of an automobile, various vehicle body components are subjected to spot welding, thereafter it is inspected whether the spot welding is properly performed in compliance with the work manual that was previously prepared. In the conventional art, the inspection is made by visual examination, that is, a worker visually checks a spot(s) formed by spot welding.

For example, the worker visually checks a vehicle body component subjected to spot welding to confirm the number and position(s) of a spot(s) formed by spot welding. After that, the worker makes a handwritten entry of results of the inspection in a check sheet or the like.

However, such an inspection technique may cause a human-induced erroneous decision because the decision relies only on the inspector's personal determination.

To solve the problem involved in the inspection technique using the visual examination, below-mentioned Patent Document 1 discloses an inspection system for evaluating a spot using a camera. In the inspection system, a pointer for pointing a spot on a vehicle body component and a camera that is arranged towards an identification section provided on the pointer are used. After the camera has been arranged at a fixed position with respect to the vehicle body component, the camera captures an image of the vehicle body component, and the position of the spot is detected on the basis of a captured image signal from the camera. The detected position of the spot is then collated with a spot position previously recorded to determine whether the detected position of the spot is proper.

PRIOR ART DOCUMENT

Patent Document

Patent Document 1: JP-A-2007-152371

SUMMARY OF THE INVENTION

However, when the inspection system disclosed in Patent Document 1 is employed, it is necessary to arrange the camera fixedly at a predetermined position with respect to the vehicle body component. For this reason, the preparatory work takes time and man-hour. Further, in addition to the camera, at least a fixing member for fixing the camera and the pointer for pointing a spot need to be prepared, and the inspection is made costly.

Therefore, in designing of a system of this kind, a technique that enables evaluation of the work region of a vehicle body component in a simple and low-cost manner, has been demanded. Further, in this technique, it is preferable that not only a work region where a spot is formed by spot welding but also other work regions such as an opening hole formed in the vehicle body component, a bolt, a nut, and a washer that are welded to the vehicle body component can be evaluated.

The present invention has been made in view of such a problem and it is intended to provide a technique effective for evaluating a work region of a vehicle body component in a simple and low-cost manner.

One aspect of the present invention is an evaluation system for a work region of a vehicle body component, the evaluation system including:

an imaging unit that records a three-dimensional image of the vehicle body component; and a processing unit that performs evaluation processing on the work region of the vehicle body component on the basis of the three-dimensional image of the vehicle body component recorded by the imaging unit, wherein the processing unit includes:

an image processing section that converts the three-dimensional image to three-dimensional image data, an extraction section that extracts the work region and a reference region of the vehicle body component respectively from both the three-dimensional image data and three-dimensional design data used in designing the vehicle body component, an alignment section that aligns the three-dimensional image data with the three-dimensional design data with reference to the reference regions, and an evaluation section that evaluates a relation between the work region extracted from the three-dimensional image data by the extraction section and the work region extracted from the three-dimensional design data by the extraction section, on the basis of the three-dimensional image data and the three-dimensional design data aligned with each other by the alignment section.

Another aspect of the present invention is an evaluation method for a work region of a vehicle body component, the method including:

preparing an imaging unit that records a three-dimensional image of the vehicle body component;

converting the three-dimensional image of the vehicle body part recorded by the imaging unit to three-dimensional image data;

extracting the work region and a reference region of the vehicle body component respectively from both the converted three-dimensional image data and three-dimensional design data used in designing the vehicle body component;

aligning the three-dimensional image data with the three-dimensional design data with reference to the extracted reference regions; and evaluating a relation between the work region extracted from the three-dimensional image data and the work region extracted from the three-dimensional design data, on the basis of the three-dimensional image data and the three-dimensional design data aligned with each other.

In the evaluation system for a work region of a vehicle body component and the evaluation method for a work region of a vehicle body component, the reference region can be extracted from the three-dimensional image data, and the three-dimensional image data can be aligned with the three-dimensional design data with reference to the extracted reference region. Thus, the imaging unit needs not be arranged fixedly at a predetermined position with respect to the vehicle body component. A relatively inexpensive imaging unit such as a portable 3D camera can be used, accordingly.

Further, the worker can readily capture an image of the vehicle body component with the imaging unit without concern about the imaging environment (such as an angle, brightness, and distance with respect to the vehicle body component).

Moreover, in a case where the work region is not visually evaluated, the time and man-hour required for the evaluation can be kept down, and a human-induced erroneous decision can be avoided.

As described above, the evaluation system for a work region of a vehicle body component and the evaluation method for a work region of a vehicle body component enable to evaluate the work region of a vehicle body component in a simple and low-cost manner.

DETAILED DESCRIPTION

In an embodiment of the present invention, a "work region" corresponds to a region in the vehicle body component of a vehicle body on which a predetermined work has been done or is to be done. Thus, evaluation performed on the work region determines whether a result of the work that has been actually done on the work region is as designed, or whether the work has been done on the work region as intended.

In the evaluation system for a work region of a vehicle body component, the extraction section of the processing unit preferably includes a classifier having preliminarily undergone mechanical learning so as to identify features of each shape of the work region and the reference region, and preferably extract the work region and the reference region by the classifier, respectively.

Such configuration can raise the accuracy for extracting each the work region and the reference region in the extraction unit.

In the evaluation system for a work region of a vehicle body component, the alignment section preferably aligns the three-dimensional image data with the three-dimensional design data by aligning a coordinate system of the three-dimensional image data with a coordinate system of the three-dimensional design data with reference to the reference regions extracted by the extraction section.

Such configuration can raise the accuracy for aligning the three-dimensional image data with the three-dimensional design data in the alignment section.

In the evaluation system for a work region of a vehicle body component, the evaluation section of the processing unit preferably gives the relation between the work regions an evaluation that a predetermined work has been done on the work region as designed in a case where the work region is extracted from the three-dimensional image data and a distance between the extracted work region and the work region extracted from the three-dimensional design data is smaller than a predetermined tolerance.

Such configuration enables the evaluation section to make an appropriate evaluation.

In the evaluation system for a work region of a vehicle body component, the work region of the vehicle body component is preferably a region for forming a spot of spot welding.

Such configuration enables evaluation of the spot of spot welding in the relation between the spot in the three-dimensional image data and the spot of in the three-dimensional design data.

The evaluation system for a work region of a vehicle body component preferably further includes an output unit that outputs a result of the evaluation given by the evaluation section of the processing unit.

Such configuration enables plural persons to check the evaluation result output by the output unit. Consequently, a human-induced erroneous decision can be made to hardly occur.

In the evaluation system for a work region of a vehicle body component, the output unit preferably displays a three-dimensional image of the work region along with the result of the evaluation.

Such configuration enables a worker or a checker to easily confirm whether the work has been done on the work region as designed by focusing on the three-dimensional image.

Hereinafter, an evaluation system for a work region of a vehicle body component and an evaluation method for a work region of a vehicle body component according to the present embodiment will be described with reference to the drawings.

Figure 1:
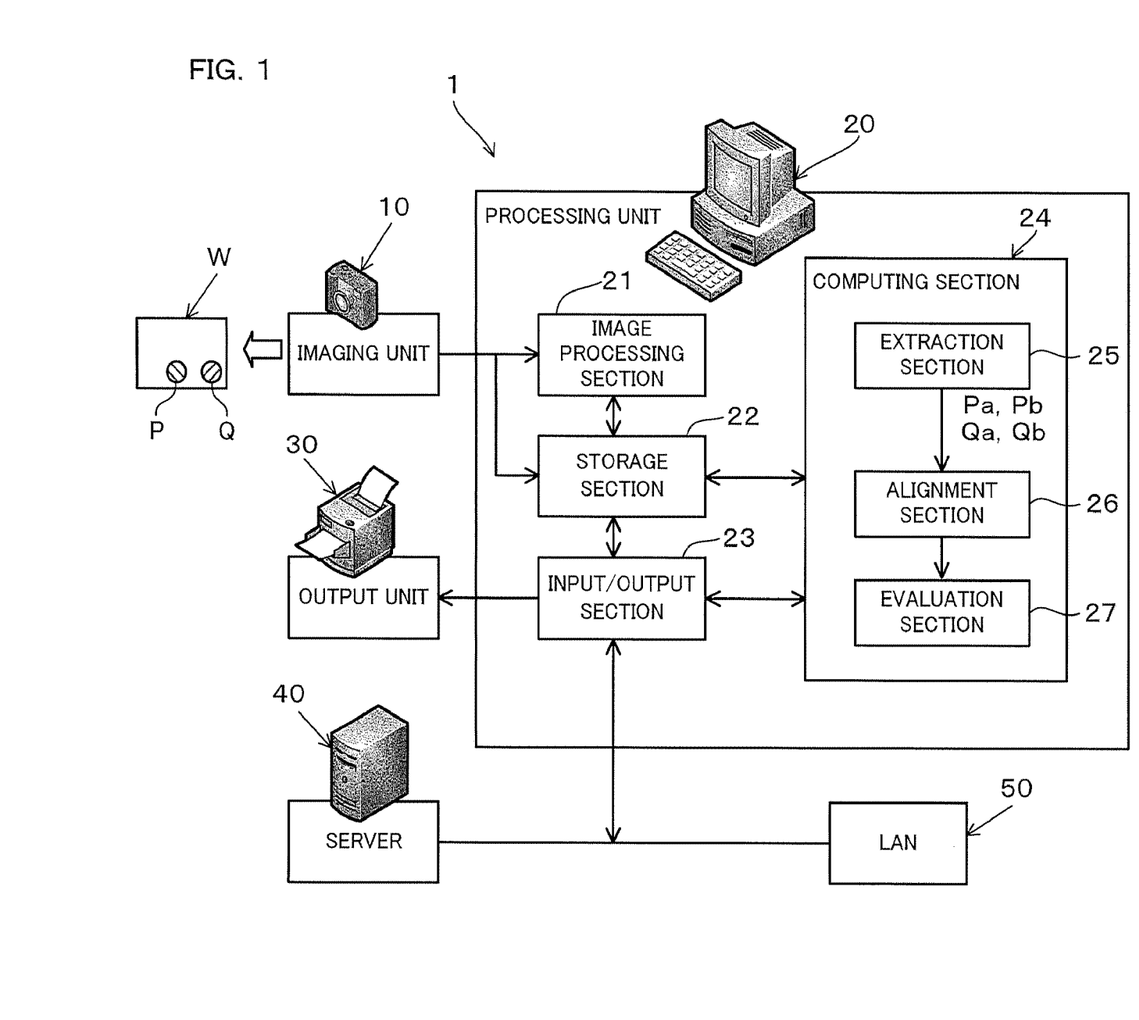
FIG. 1 is an overview of an evaluation system for a work region of a vehicle body component according to an embodiment of the present invention.

As shown in FIG. 1, a work region evaluating system 1 is an evaluation system for evaluating a work region of a vehicle body component W. The work region evaluating system 1 includes an imaging unit 10, a processing unit 20, an output unit 30, a server 40, and a LAN 50. The work region evaluating system 1 can also be called or replaced with "a work region evaluating apparatus." Various products composing an automobile body are intended as the vehicle body component W. The vehicle body component W has a work region P and a reference region Q.

The imaging unit 10 has a function of recording a three-dimensional image of the vehicle body component W by capturing an image of the vehicle body component W. When connected to the processing unit 20, the imaging unit 10 can transmit and receive data to and from the processing unit 20. When capturing an image of the vehicle body component W, the imaging unit 10 may be connected to the processing unit 20 or may be disconnected from the processing unit 20.

In the present embodiment, the imaging unit 10 includes a 3D camera. As the 3D camera, a compound-eye type camera that combines images captured through two lenses to produce a three-dimensional image, or a monocular camera that combines images captured twice through a single lens at different imaging angles to produce a three-dimensional image, is available. As such 3D camera, a portable compact camera or a large-sized fixed point camera to be arranged at a predetermined position is available. If the accuracy required for processing in the processing unit 20 as described later is not so high, it is preferable to use a portable compact camera, which is inexpensive and has high cost performance.

The processing unit 20 has a function of performing evaluation processing on the work region P of the vehicle body component W on the basis of the three-dimensional image of the vehicle body component W recorded by the imaging unit 10. The processing unit 20 includes an image processing section 21, a storage section 22, an input/output section 23, and a computing section 24. The processing unit 20 includes a desktop-type or notebook-type personal computer (PC) each provided with a monitor (display means), a keyboard (input means), a mouse (selection means), a CPU, a ROM, a RAM, and other components.

The output unit 30 includes at least one of a printer for outputting data by printing, a monitor for outputting data by display, and a loudspeaker for outputting data by voice.

The server 40 has a function of storing input data transmitted via the LAN 50, reading out the stored data in response to a control signal from a request source, and transmitting the read-out data to the request source. The server 40 is configured to store, as the input data, three-dimensional design data (also referred to as "three-dimensional CAD data") on each of a plurality of the vehicle body components W. The three-dimensional design data is three-dimensional point group data in the design of the vehicle body component W, and have been prepared on the basis of a requirement specification (a work manual) of the vehicle body component W.

The image processing section 21 has a function of converting the three-dimensional image of the vehicle body component W captured by the imaging unit 10 to three-dimensional point group data expressed by orthogonal coordinates (X, Y, Z), that is, three-dimensional image data (also referred to as "three-dimensional product data"). The three-dimensional image data of the vehicle body component W thus obtained by the image processing section 21 is transmitted to the storage section 22.

The image processing section 21 is configured to perform conversion processing to convert the three-dimensional image to the three-dimensional image data in response to a predetermined processing start signal. Instead, the image processing section 21 may be configured to automatically perform such conversion processing at the timing when the imaging unit 10 is connected to the processing unit 20.

The storage section 22 has a function of memorizing (storing) the three-dimensional image transmitted from the imaging unit 10, the three-dimensional image data transmitted from the image processing section 21, and the three-dimensional design data transmitted from the server 40 via the input/output section 23. The storage section 22 can transmit and receive the data to and from each of the image processing section 21, the input/output section 23, and the computing section 24.

The input/output section 23 has a function of transmitting and receiving data to and from an external apparatus. The external apparatus is composed of, for example, a plurality of OA terminals connected respectively to the output unit 30, the server 40, and the LAN 50.

The computing section 24 has a function of processing information input from the storage section 22 or the input/output section 23 and includes an extraction section 25, an alignment section 26, and an evaluation section 27.

The extraction section 25 has a function of reading out the three-dimensional image data converted by the image processing section 21 and the three-dimensional design data used in designing the vehicle body component W respectively from the storage section 22 and extracting work regions Pa and Pb and reference regions Qa and Qb respectively from both the three-dimensional image data and the three-dimensional design data.

In the present embodiment, the work region P of the vehicle body component W is predetermined as a region where a spot welding point (hereinafter also simply referred to as "spot") is to be formed by spot welding. The reference region Q of the vehicle body component W is predetermined as a region where an opening hole is formed.

The alignment section 26 has a function of aligning the three-dimensional image data with the three-dimensional design data with reference to the reference regions Qa and Qb extracted by the extraction section 25. The reference region Qa is extracted from the three-dimensional design data by the extraction section 25. The reference region Qb is extracted from the three-dimensional image data by the extraction section 25.

The evaluation section 27 evaluates a relation between the work region Pa extracted from the three-dimensional design data by the extraction section 25 and the work region Pb extracted from the three-dimensional image data by the extraction section 25, on the basis of the three-dimensional image data and the three-dimensional design data which are aligned with each other by the alignment section 26. Specifically, the evaluation section 27 evaluates whether the state of the work region Pb corresponding to the work region P where a work is to be actually done meets the requirement specification of the work region Pa, that is, whether the work has been done on the work region P as designed.

This evaluation does not target only whether the work has been actually done on the work region P. If the work has been actually done on the work region P, the comparison between the work region Pa and the work region Pb determines whether the result of the work actually done on the work region P (number and position) is as designed. On the other hand, if the work has not been actually done on the work region P, the comparison between the work region Pa and the work region Pb determines whether the work has been done on the work region P as intended.

Figure 2:
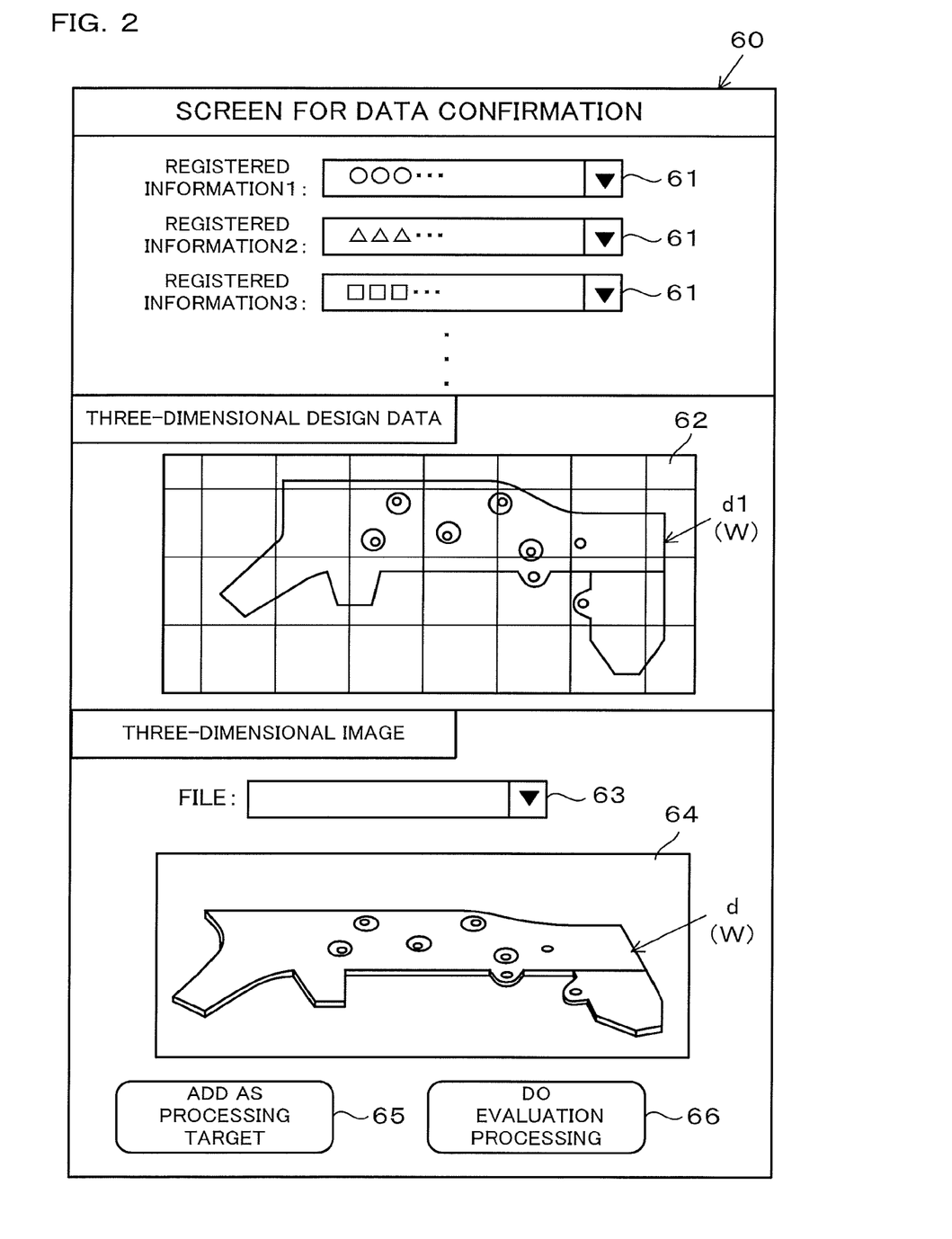
FIG. 2 is a view showing a display example of a screen for data confirmation in a processing unit in FIG. 1.

A three-dimensional image d of the vehicle body component W recorded by the imaging unit 10 is registered, for example, on a screen for data confirmation (refer to FIG. 2)

to be displayed on the monitor of the processing unit 20. The screen for data confirmation displays a plurality of input fields 61 with a pull-down menu from which registered information can be selected. The registered information in the input fields 61 contains, for example, a management number of the robot that actually performed spot welding on the vehicle body component W. A display section 62 of the screen for data confirmation displays three-dimensional design data d1 of the vehicle body component W which is identified by the registered information in the input fields 61. Further, a display section 64 of the screen for data confirmation displays the three-dimensional image d of the vehicle body component W which has been saved in a file designated in a file field 63.

As preparation before performing processing in the processing unit 20, a worker captures an image of the vehicle body component W with the imaging unit 10. At this point, it is necessary for the captured image of the vehicle body component W to include both the work region P and the reference region Q. The three-dimensional image d of the vehicle body component W to be used in the processing performed by the processing unit 20 is thus produced.

The three-dimensional image d displayed on the display section 64 is stored in the storage section 22 as information linked to the three-dimensional design data d1 when a displayed area 65 having an indication of "add as processing target" is clicked. When a displayed area 66 having an indication of "do evaluation processing" is clicked, the processing by the processing unit 20 is automatically performed in response to the predetermined processing start signal. The process will be described below with reference to FIGS. 3 to 13.

Figure 3:
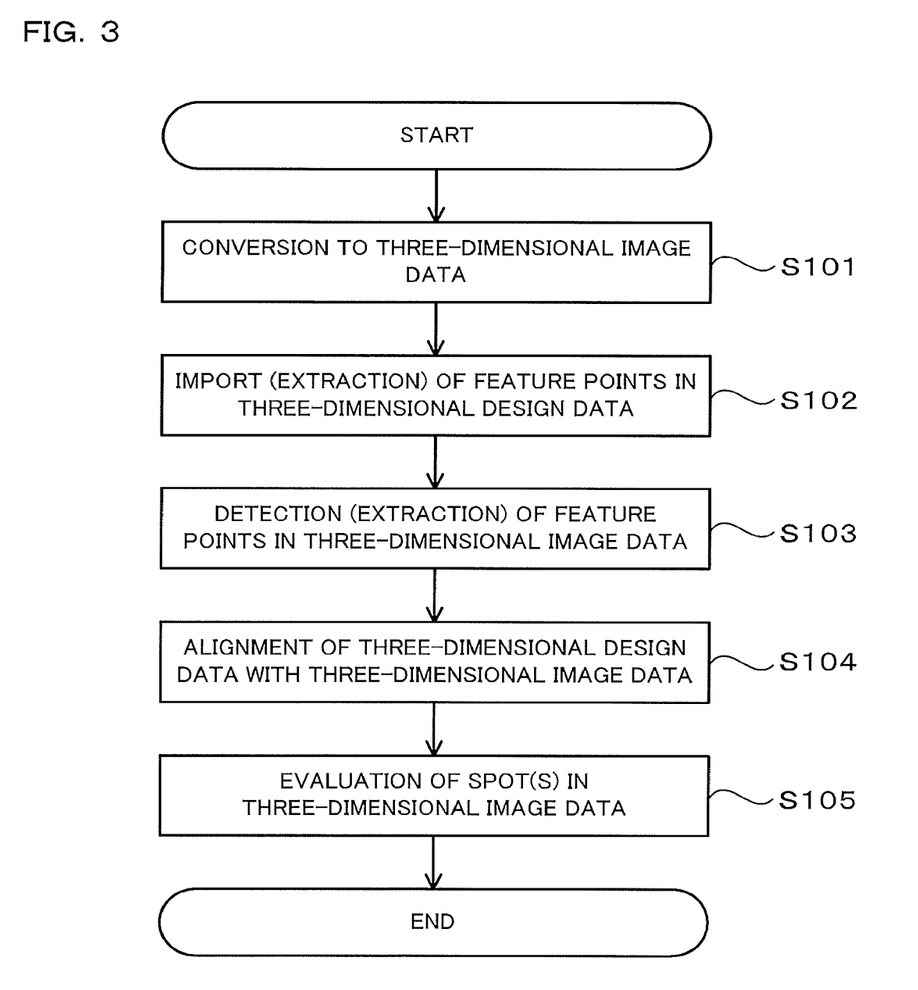
FIG. 3 is a view showing a processing flow in the processing unit in FIG. 1.

The processing to be performed by the processing unit 20 includes steps S101 to S105 as shown in FIG. 3. One or more steps may be added to these steps as required.

Step S101 is the step of converting the three-dimensional image d of a vehicle body component W as designated to three-dimensional image data d2 (first step). Step S101 is performed by the image processing section 21 of the processing unit 20. In step S101, the three-dimensional image d of the vehicle body component W is read out from the storage section 22 and converted to the three-dimensional image data d2 that is three-dimensional point group data expressed by the orthogonal coordinates (X, Y, Z). The three-dimensional image data d2 obtained in step S101 is stored in the storage section 22.

Figure 4:
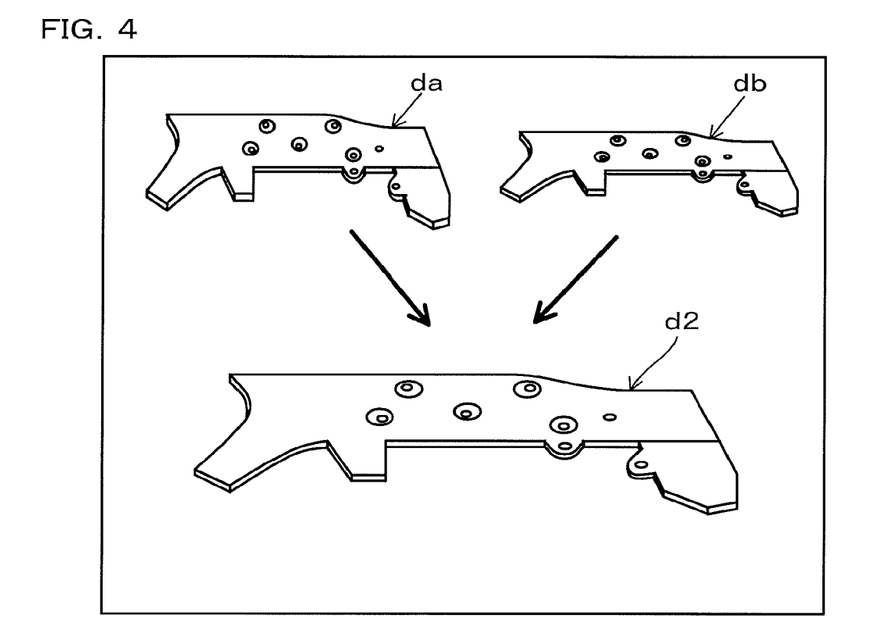
FIG. 4 is a view schematically showing a processing in a first step of the processing flow of FIG. 3.

To raise the processing accuracy of the processing unit 20, it is preferable to use a plurality of three-dimensional images d of the vehicle body component W captured at different angles as shown in FIG. 4 (FIG. 4 shows two three-dimensional images, namely, three-dimensional image da and three-dimensional image db).

Step S102 is the step of importing the work region Pa and the reference region Qa of the designated vehicle body component W as characteristic points in the three-dimensional design data d1 (second step). Step S102 is executed by the extraction section 25 of the processing unit 20. In step S102, the three-dimensional design data d1 is read out from the storage section 22, and data on the work region Pa is imported (extracted) from the three-dimensional design data d1.

Figure 5:
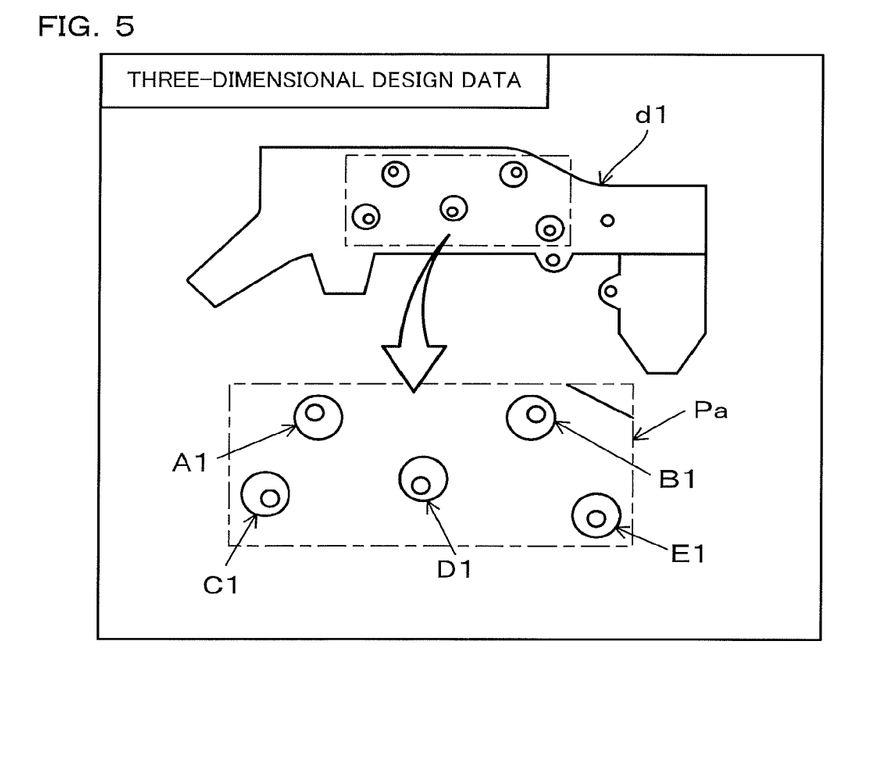
FIG. 5 is a view schematically showing extraction of data about a work region in a second step of the processing flow of FIG. 3.
Figure 6:
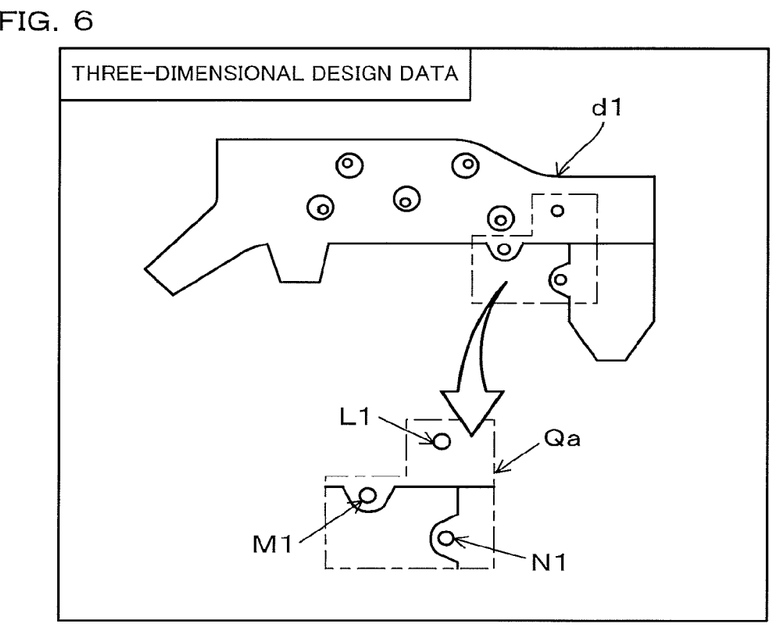
FIG. 6 is a view schematically showing extraction of data about a reference region in the second step of the processing flow of FIG. 3.

As shown in FIG. 5, the work region Pa contains five spots A1, B1, C1, D1, and E1 which are to be formed on the vehicle body component W by spot welding, as shown in FIG. 5. Similarly, data on the reference region Qa is imported (extracted) from the three-dimensional design data d1. As shown in FIG. 6, the reference region Qa contains three opening holes L1, M1, and N1 which are to be provided in the vehicle body component W.

Step S103 is the step of detecting the work region Pb and the reference region Qb of the designated vehicle body component W as characteristic points in the three-dimensional image data d2 (third step). Step S103 is performed by the extraction section 25 of the processing unit 20. Step S103 may be executed concurrently with step S102, may be executed before step S102, or may be executed subsequently to step S102.

Figure 7:
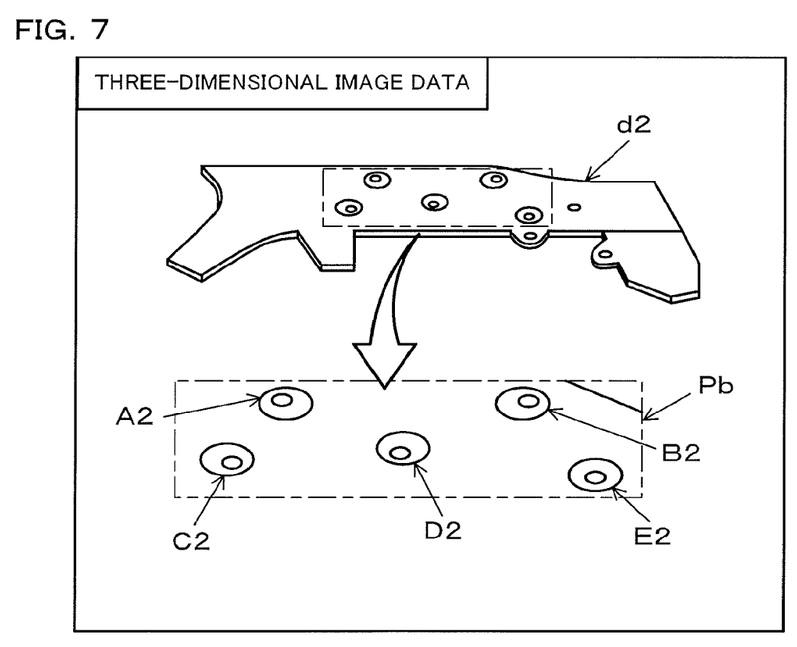
FIG. 7 is a view schematically showing extraction of data about a work region in a third step of the processing flow of FIG. 3.
Figure 8:
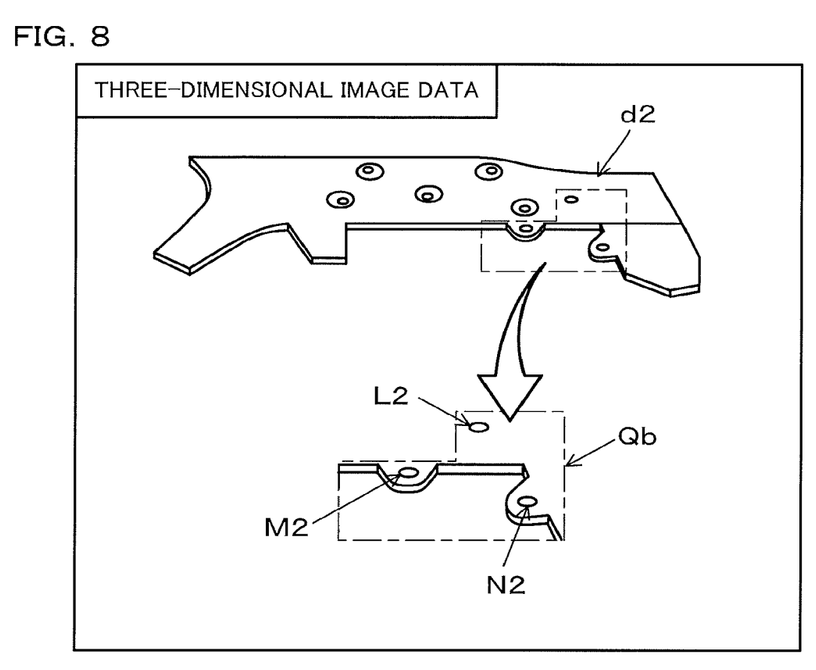
FIG. 8 is a view schematically showing extraction of data about a reference region in the third step of the processing flow of FIG. 3.

In step S103, the three-dimensional image data d2 is read out from the storage section 22, and data on the work region Pb is detected (extracted) from the three-dimensional image data d2. As shown in FIG. 7, the work region Pb contains five spots A2, B2, C2, D2, and E2 which are expected to have been formed by the spot welding on the vehicle body component W. Similarly, data on the reference region Qb is detected (extracted) from the three-dimensional image data d2. As shown in FIG. 8, the reference region Qb contains three opening holes L2, M2, and N2 formed in the vehicle body component W.

Figure 9:
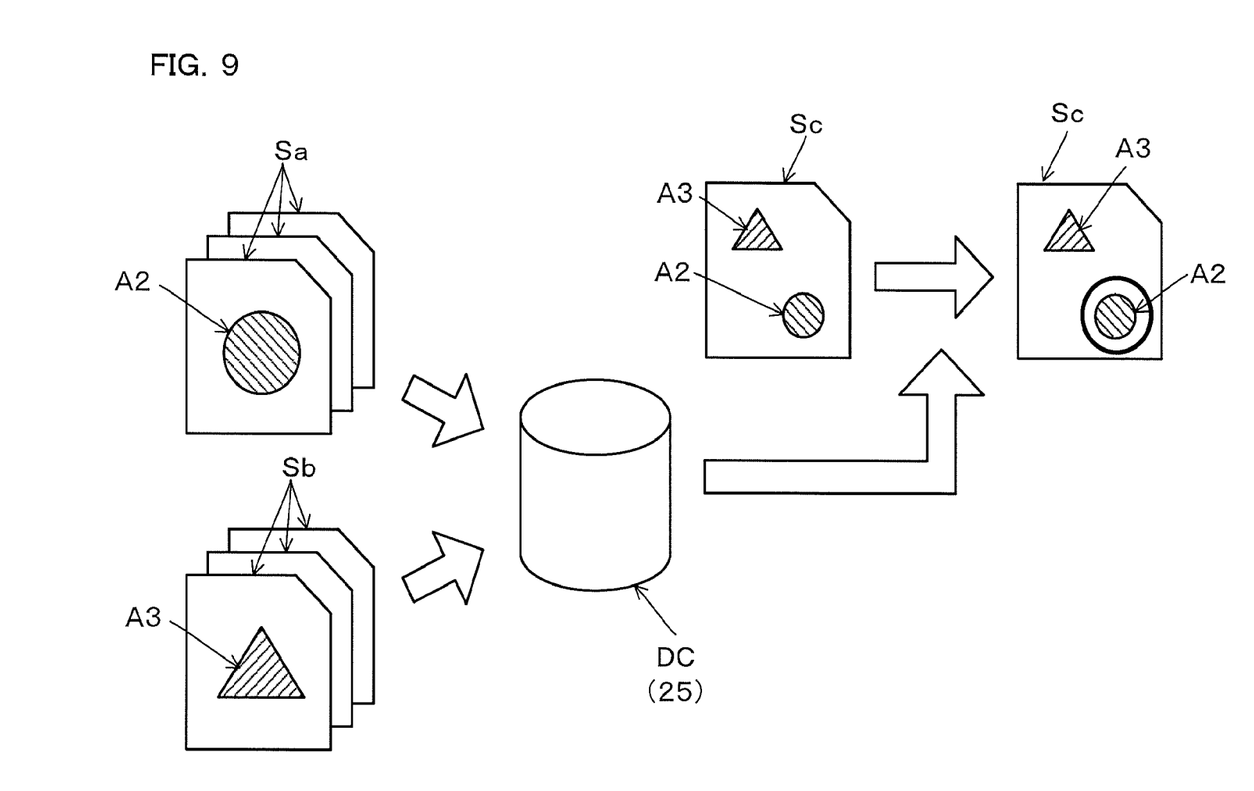
FIG. 9 is a view for describing a logic of extraction for use in the third step.

According to the present embodiment, in order to extract the work region Pa and the reference region Qa in step S102 and the work region Pb and the reference region Qb in step S103 with good accuracy, an extraction logic shown in FIG. 9 is used. To execute the extraction logic, the extraction section 25 of the processing unit 20 includes a classifier DC.

For example, in order to extract the spot A2 contained in the work region Pb, the classifier DC has preliminarily undergone mechanical learning so as to identify the features of the shape of the spot A2 as shown in FIG. 9. In this case, a plurality of sample image data Sa containing the spot A2 and a plurality of sample image data Sb containing a figuration A3 shaped differently from the spot A2 are prepared. These plurality of sample image data Sa and Sb are input to the classifier DC so that the classifier DC learns the features of the shape of the spot A2 contained in the sample image data Sa. In this way, a classifier DC that can identify an identification target having the figuration identical to or similar to the figuration of the spot A2 can be prepared. In a case where input image data Sc contains both the spot A2 and the figuration A3, the classifier DC can identify the spot A2 as the identification target based on the information contained in the input image data Sc.

The other spots and reference points can also be extracted by use of the same extraction logic as that used to extract the spot A2.

As for specific techniques for preparing the classifier DC, the information available from the following websites can be referred to, i.e.
http://gihyo.jp/dev/feature/01/opencv/0003 regarding preparation of a classifier based on a Haar-Like algorithm;
http://compsci.world.coocan.jp/OUJ/2012PR/pr_15_a.pdf regarding preparation of a classifier based on an LBP algorithm; and
http://www.vision.cs.chubu.ac.jp/joint_hog/pdf/HOG+Boosting_LN.pdf regarding preparation of a classifier based on an HOG algorithm.

Step S104 is the step of aligning the three-dimensional design data d1 and the three-dimensional image data d2 with each other with reference to the reference regions Qa and Qb extracted by the extraction section 25 (fourth step). Step S104 is executed by the alignment section 26 of the processing unit 20 after steps S102 and S103 have been completed.

Figure 10:
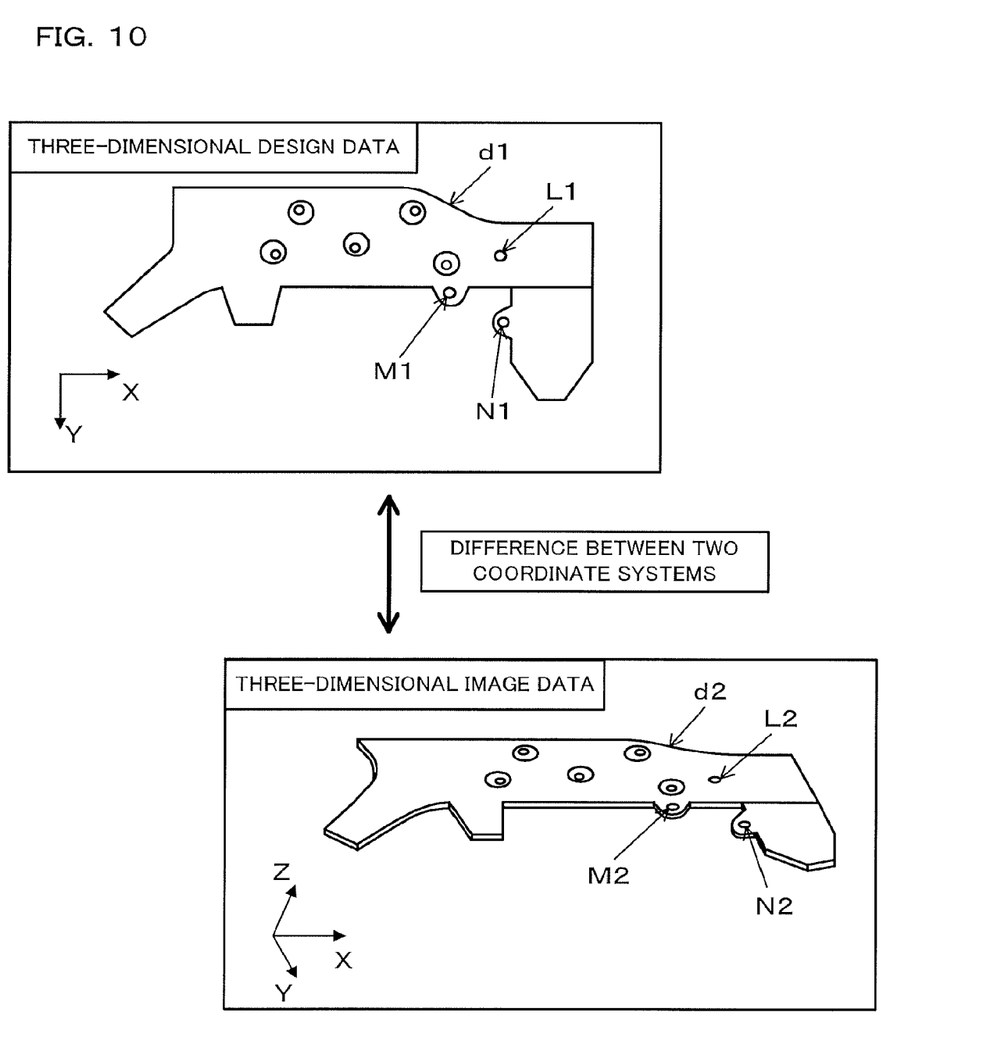
FIG. 10 is a view for describing the difference of coordinate systems in three-dimensional design data and three-dimensional image data.

The coordinate system of the three-dimensional image data, which fluctuates case by case depending on the capturing position of an image capturing person (not constant), does not coincide with the coordinate system of the three-dimensional design data. For this reason, the coordinate system of the three-dimensional image data d2 differs from the coordinate system of the three-dimensional design data d1 as shown in FIG. 10. The alignment section 26 can align the coordinate system of the three-dimensional image data d2 with the coordinate system of the three-dimensional design data d1 by aligning the reference region Qa and the reference region Qb with each other.

Figure 11:
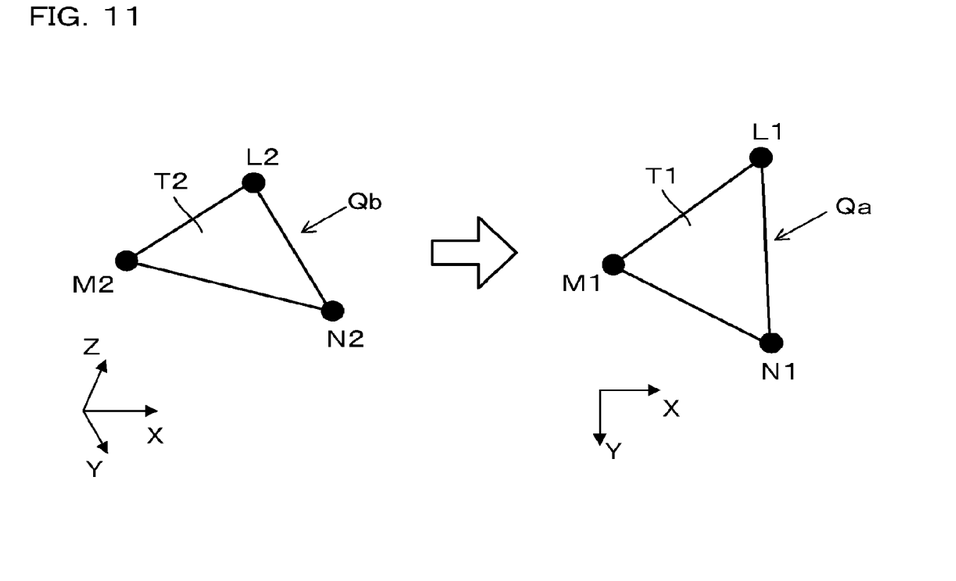
FIG. 11 is a view for describing a logic of conversion in the coordinate systems.

Specifically, as referred in the conversion logic shown in FIG. 11, a triangular shape T1 having as apexes the three opening holes L1, M1, and N1 that are contained in the reference region Qa in the three-dimensional design data d1 is compared with a triangular shape T2 having as apexes the three opening holes L2, M2, and N2 that are contained in the reference region Qb in the three-dimensional image data d2. Next, the coordinate system of the three-dimensional image data d2 is converted so that the opening hole L2 aligns with the opening hole L1, the opening hole M2 aligns with the opening hole M1, and the opening hole N2 aligns with the opening hole N1.

Figure 12:
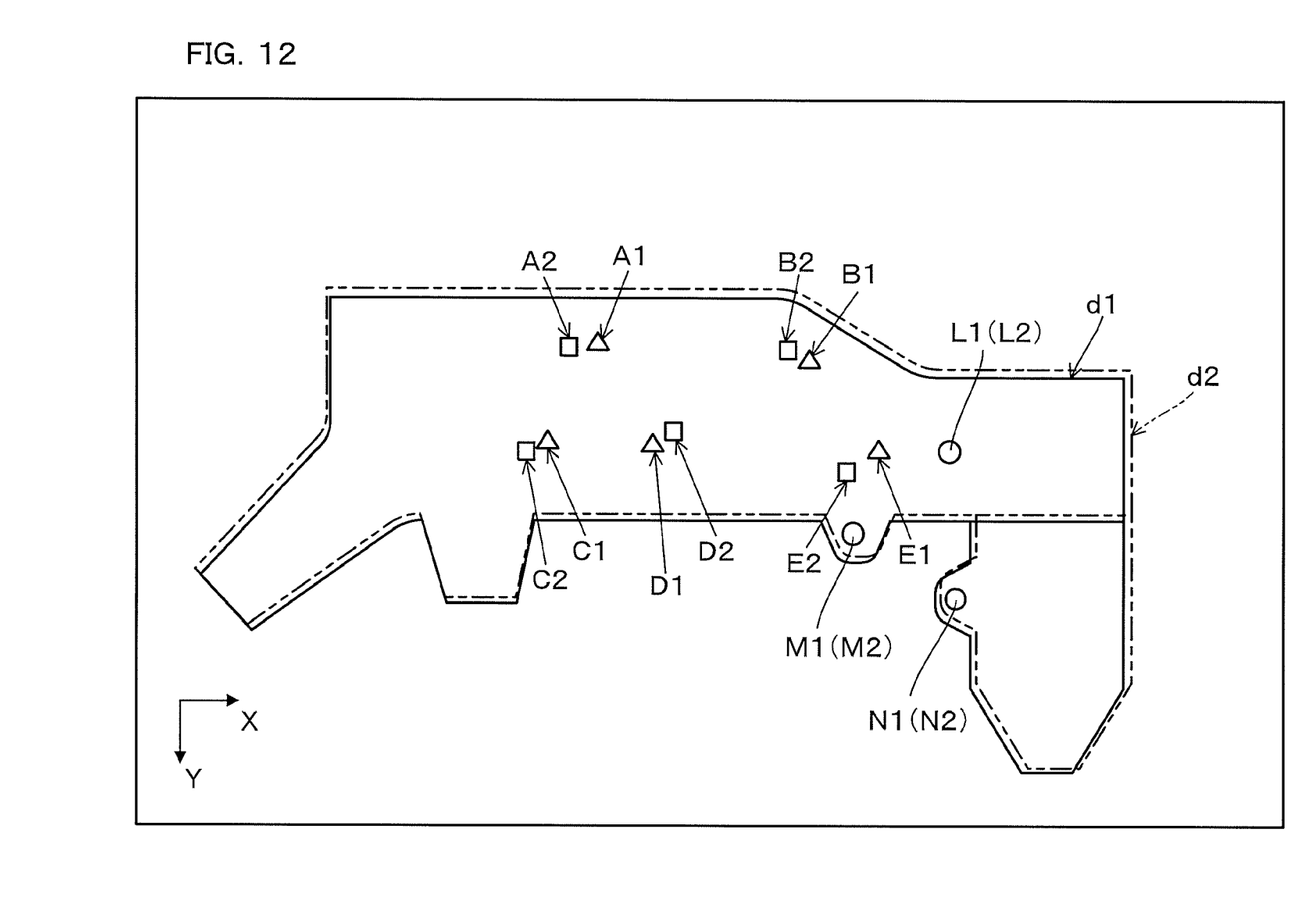
FIG. 12 is a view showing that the three-dimensional design data and the three-dimensional image data are superposed on each other in the same coordinate system.

As a result, the three-dimensional design data d1 and the three-dimensional image data d2 are displayed in a superposed state so that the reference region Qa and the reference region Qb coincide with each other in the same coordinate system, as shown in FIG. 12. In this conversion logic, at least three reference points such as the opening holes are required to align the different coordinate systems with each other.

Step S105 is the step of evaluating the relation between the work region Pb extracted from the three-dimensional image data d2 and the work region Pa extracted from the three-dimensional design data d1. Step S105 is executed by the evaluation section 27 of the processing unit 20 after step S104 has been completed. As referred in FIG. 12, in step S105, the relation between the work region Pa (spots A1, B1, C1, D1, and E1) in the three-dimensional design data d1 (refer to the solid line in the figure) and the work region Pb (spots A2, B2, C2, D2, and E2) in the three-dimensional image data d2 (refer to the two-dot chain line in the figure) is evaluated.

Specifically, in the comparison of the three-dimensional image data d2 with the three-dimensional design data d1, it is determined whether the three-dimensional image data d2 contains spots corresponding to the spots in the three-dimensional design data d1 (First evaluation). FIG. 12 shows the three-dimensional design data d1 and the three-dimensional image data d2 in a superposed state, in which the spot contained in the three-dimensional design data d1 is represented by "Δ", and the spot contained in the three-dimensional image data d2 is represented by "☐". The first evaluation enables to check the number of spots (Number) having actually been formed on the vehicle body component W.

If the first evaluation determines that the three-dimensional image data d2 contains any spot corresponding to the spot in the three-dimensional design data d1 (in a case where a result of the first evaluation is "YES"), a further evaluation is made as to whether a positional error of a spot in the three-dimensional image data d2 with respect to the position of the corresponding spot in the three-dimensional design data d1 (hereinafter referred to as "error") is smaller than a predetermined tolerance (Second evaluation). In this case, the error is calculated in the form of the distance between the two spots under comparison. The second evaluation enables to check the position of a spot (Position) having actually been formed on the vehicle body component W.

If a result of the first evaluation is "YES" and a result of the second evaluation is "YES," the spot under the evaluation is evaluated as being accepted (OK), and is determined to be formed as designed. If every spot under evaluation is evaluated as being accepted (OK), it is determined that a predetermined work has been done on the work region P of the vehicle body component W as designed.

Figure 13:
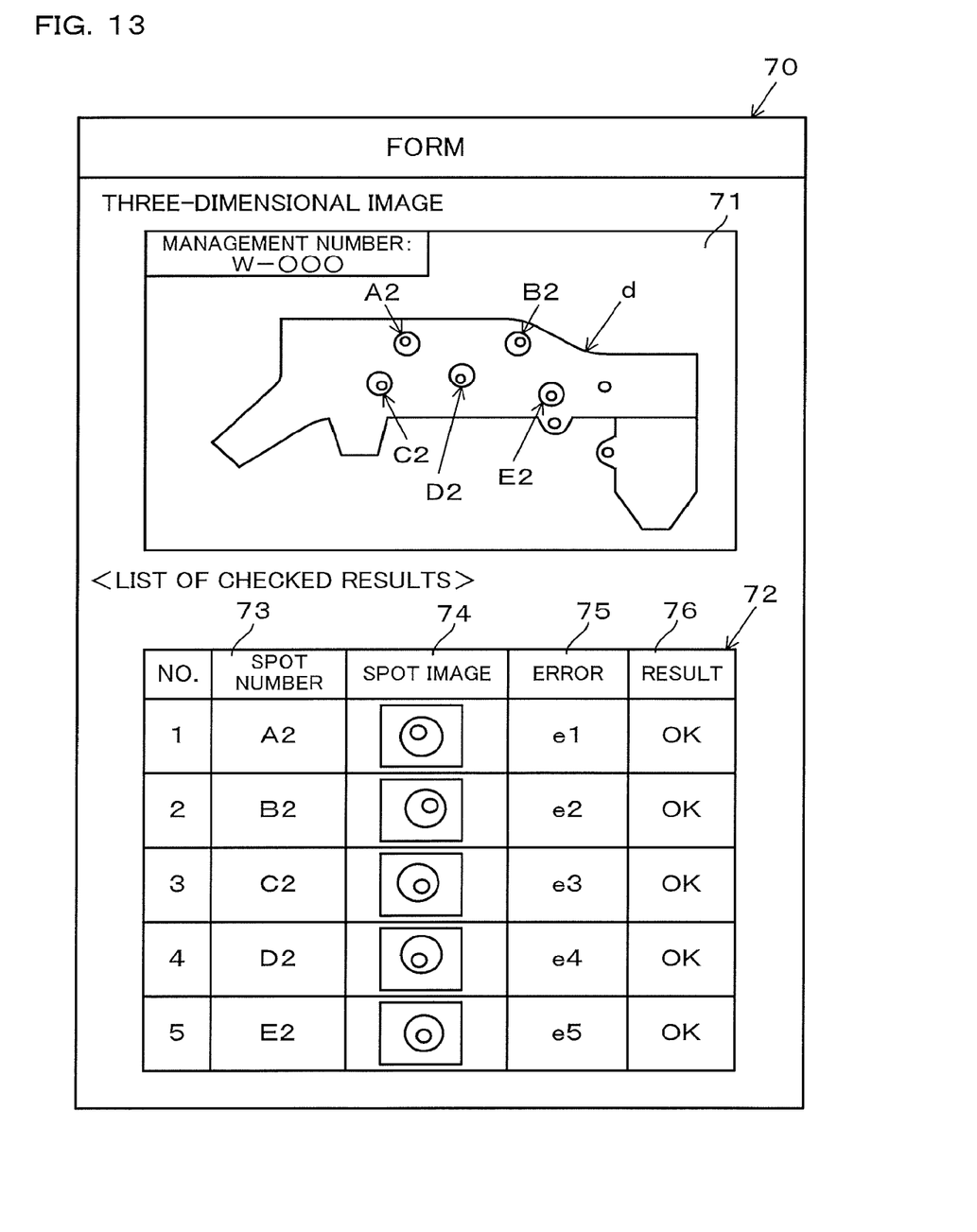
FIG. 13 is a view showing a description example of a form.

In the present embodiment, results of the evaluation performed by the evaluation section 27 are printed on a form 70 by the output unit 30 as shown in FIG. 13. The form 70 has a field 71 for displaying the three-dimensional image d of the vehicle body component W, and a check result list 72 for showing the checked results of the spots in the work region P (results of evaluation of the work region Pb in three-dimensional image data d2). The check result list 72 includes a spot number field 73 for showing each spot in the work region P, a spot image field 74, an error field 75, and a result field 76.

It is noted that the field 71 may display the three-dimensional image data d2 in place of the three-dimensional image d, and the monitor (not shown in the figures) may display the contents written on the form 70 in place of, or in addition to printing on the form 70.

In the error field 75, an error e1 is calculated on the basis of the distance between the spot A1 and the spot A2. An error e2 is calculated on the basis of the distance between the spot B1 and the spot B2. An error e3 is calculated on the basis of the distance between the spot C1 and the spot C2. An error e4 is calculated on the basis of the distance between the spot D1 and the spot D2. An error e5 is calculated on the basis of the distance between the spot E1 and the spot E2.

The worker or a checker can confirm whether the checked results of the spots are accepted (OK) by visual confirmation of the result field 76. In this way, the number and positions of the spots having actually been formed on the vehicle body component W (NP checking) can be readily checked.

Further, the present embodiment is configured to display a three-dimensional image of a spot having actually been formed on the vehicle body component W on the spot image field 74. Thus, when spot welding has been actually performed, a three-dimensional image of the spot is displayed along with a three-dimensional image of a base body for the spot welding on the spot image field 74. On the other hand, when spot welding has not been actually performed, the spot image field 74 displays no three-dimensional spot image but displays only a three-dimensional image of the base body. Consequently, the worker or a checker can easily confirm whether a spot has been actually formed at the position intended for spot welding by visual confirmation of the spot image field 74.

It is noted that the total number of spots extracted from the three-dimensional image data d2 by the extraction section 25 of the processing unit 20 and the total number of spots extracted from the three-dimensional design data d1 may be written on the form 70.

According to the embodiment as described above, the following operational effects are obtained.

According to the work region evaluating system 1 and the evaluation method employing the work region evaluating system 1, it is possible to extract the reference region Qb from the three-dimensional image data d2 and align the three-dimensional image data d2 with the three-dimensional design data d1 with reference to the extracted reference region Qb.

Thus, the imaging unit 10 needs not be arranged fixedly at a predetermined position with respect to the vehicle body component W. A relatively inexpensive imaging unit 10 such as a portable 3D camera can be used, accordingly.

Further, the worker can readily capture an image of the vehicle body component W with the imaging unit 10 without concern about the imaging environment (such as an angle, brightness, and distance with respect to the vehicle body component).

Moreover, because the work region P is automatically evaluated by the processing unit 20, namely, the evaluation for the work region P does not rely on the visual evaluation, the time and man-hour required for the evaluation can be kept down, and a human-induced erroneous decision can be avoided.

In this way, it is made possible to assess the condition of the work region P of a vehicle body component W in a simple and low-cost manner.

Because the extraction section 25 of the processing unit 20 is provided with the classifier DC, the accuracy for extracting the work regions Pa and Pb and the reference regions Qa and Qb by the extraction section 25 can be raised.

Because the alignment section 26 of the processing unit 20 aligns the coordinate system of the three-dimensional image data d2 with the coordinate system of the three-dimensional design data d1 with reference to the reference regions Qa and Qb, the accuracy for aligning the three-dimensional image data d2 with the three-dimensional design data d1 can be raised.

Because the output unit 30 for outputting results of the evaluation performed by the evaluation section 27 of the processing unit 20 is used, the evaluation results output by the output unit 30 can be checked by plural persons. Thus, the human-induced erroneous decision can be made to hardly occur.

Further, information output by the output unit 30 contains a three-dimensional image of the work region P along with the results of the evaluation performed by the evaluation section 27 of the processing unit 20. A worker or a checker can easily confirm whether the predetermined work has been done on the work region P as designed by focusing on the three-dimensional image.

The present invention is not limited only to the typical embodiment described above, and various applications and modifications are conceivable insofar as the applications and modifications do not depart from the object of the present invention. For example, the following modes (embodiments) in which the aforementioned embodiment is applied or modified can be reduced into practice.

In the aforementioned embodiment, the region for forming a spot by spot welding is exemplified as the work region P of the vehicle body component W. However, other regions can be the work region P. Typical examples of the other regions include the region for forming an open hole(s) on the vehicle body component W, the region for joining a bolt(s), a nut(s), a washer(s), and the like to the vehicle body component W.

In the aforementioned embodiment, the region having the opening formed therein is exemplified as the reference region Q of the vehicle body component W. However, other region can be the reference region Q. Typical examples of the other regions include the region for joining a bolt(s), a nut(s), a washer(s), and the like to the vehicle body component W, and the region for forming a spot by spot welding. As another example, the work region can also serve the reference region.

In the aforementioned embodiment, a 3D camera is exemplified as the imaging unit 10. However, any other device having the same function as of the 3D camera, for example, a tablet terminal, can be used in place of the 3D camera.

The invention claimed is:

1. An evaluation apparatus for a work region of a vehicle body component, the evaluation apparatus comprising:
   circuitry configured to:
   convert a three-dimensional image of the vehicle body component to three-dimensional image data,
   extract the work region of the vehicle body component in the three-dimensional image data,
   extract a reference region of the vehicle body component in the three-dimensional image data,
   extract a work region of the vehicle body component in three-dimensional design data used in designing the vehicle body component,
   extract a reference region of the vehicle body component in the three-dimensional design data used in designing the vehicle body component,
   align the three-dimensional image data with the three-dimensional design data using the reference region in the three-dimensional image data and the reference region in the three-dimensional design data, and
   evaluate the work region of the vehicle body component based upon a distance between the work region in the aligned three-dimensional image data and the work region in three-dimensional design data, wherein
   each of the work regions of the vehicle body component is a region for forming a spot of spot welding, and
   each of the reference regions of the vehicle body component is a region where an opening hole is formed.

2. The evaluation apparatus for a work region of a vehicle body component according to claim 1, wherein the circuitry is configured to:
   store a classifier having preliminarily undergone mechanical learning so as to identify features of each shape of the work regions and the reference regions, and
   extract the work regions and the reference regions using the classifier.

3. The evaluation apparatus for a work region of a vehicle body component according to claim 1, wherein the circuitry is configured to align the three-dimensional image data with the three-dimensional design data by aligning a coordinate system of the three-dimensional image data with a coordinate system of the three-dimensional design data using the reference regions.

4. The evaluation apparatus for a work region of a vehicle body component according to claim 2, wherein the circuitry is configured to align the three-dimensional image data with the three-dimensional design data by aligning a coordinate system of the three-dimensional image data with a coordinate system of the three-dimensional design data using the reference regions.

5. The evaluation apparatus for a work region of a vehicle body component according to claim 1, wherein the circuitry is configured to evaluate that a predetermined work has been done on the work region of the vehicle body component as designed in a case where the distance is smaller than a predetermined tolerance.

6. The evaluation apparatus for a work region of a vehicle body component according to claim 2, wherein the circuitry is configured to evaluate that a predetermined work has been done on the work region of the vehicle body component as designed in a case where the distance is smaller than a predetermined tolerance.

7. The evaluation apparatus for a work region of a vehicle body component according to claim 3, wherein the circuitry is configured to evaluate that a predetermined work has been done on the work region of the vehicle body component as designed in a case where the distance is smaller than a predetermined tolerance.

8. The evaluation apparatus for a work region of a vehicle body component according to claim 1, wherein the circuitry is configured to output a result of the evaluation.

9. The evaluation apparatus for a work region of a vehicle body component according to claim 2, wherein the circuitry is configured to output a result of the evaluation.

10. The evaluation apparatus for a work region of a vehicle body component according to claim 3, wherein the circuitry is configured to output a result of the evaluation.

11. The evaluation apparatus for a work region of a vehicle body component according to claim 4, wherein the circuitry is configured to output a result of the evaluation.

12. The evaluation apparatus for a work region of a vehicle body component according to claim 8, wherein circuitry is configured to output a three-dimensional image of the work region of the vehicle body component in the three-dimensional image data along with the result of the evaluation.

13. The evaluation apparatus for a work region of a vehicle body component according to claim 9, wherein circuitry is configured to output a three-dimensional image of the work region of the vehicle body component in the three-dimensional image data along with the result of the evaluation.

14. The evaluation apparatus for a work region of a vehicle body component according to claim 10, wherein circuitry is configured to output a three-dimensional image of the work region of the vehicle body component in the three-dimensional image data along with the result of the evaluation.

15. The evaluation apparatus for a work region of a vehicle body component according to claim 11, wherein circuitry is configured to output a three-dimensional image of the work region of the vehicle body component in the three-dimensional image data along with the result of the evaluation.

16. An evaluation method for a work region of a vehicle body component, the method comprising:
converting a three-dimensional image of the vehicle body component to three-dimensional image data;
extracting the work region of the vehicle body component in the three-dimensional image data;
extracting a reference region of the vehicle body component in the three-dimensional image data;
extracting a work region of the vehicle body component in three-dimensional design data used in designing the vehicle body component;
extracting a reference region of the vehicle component both in the three-dimensional design data used in designing the vehicle body component;
aligning the three-dimensional image data with the three-dimensional design data using the reference region in the three-dimensional image data and the reference region in the three-dimensional design data; and
evaluating the work region of the vehicle body component based upon a distance between the work region in the aligned three-dimensional image data and the work region in three-dimensional design data, wherein
each of the work regions of the vehicle body component is a region for forming a spot of spot welding, and
each of the reference regions of the vehicle body component is a region where an opening hole is formed.

17. The evaluation apparatus for a work region of a vehicle body component according to claim 1, wherein the circuitry is configured to align the three-dimensional image data with the three-dimensional design data by superposing the three-dimensional image data and the three-dimensional design data.

18. An evaluation apparatus for a work region of a vehicle body component, the evaluation apparatus comprising:
means for converting a three-dimensional image of the vehicle body component to three-dimensional image data;
means for extracting the work region of the vehicle body component in the three-dimensional image data;
means for extracting a reference region of the vehicle body component in the three-dimensional image data;
means for extracting a work region of the vehicle body component in three-dimensional design data used in designing the vehicle body component;
means for extracting a reference region of the vehicle body component in the three-dimensional design data used in designing the vehicle body component;
means for aligning the three-dimensional image data with the three-dimensional design data using the reference region in the three-dimensional image data and the reference region in the three-dimensional design data; and
means for evaluating the work region of the vehicle body component based upon a distance between the work region in the aligned three-dimensional image data and the work region in three-dimensional design data, wherein
each of the work regions of the vehicle body component is a region for forming a spot of spot welding, and
each of the reference regions of the vehicle body component is a region where an opening hole is formed.

* * * * *